Figure 1:
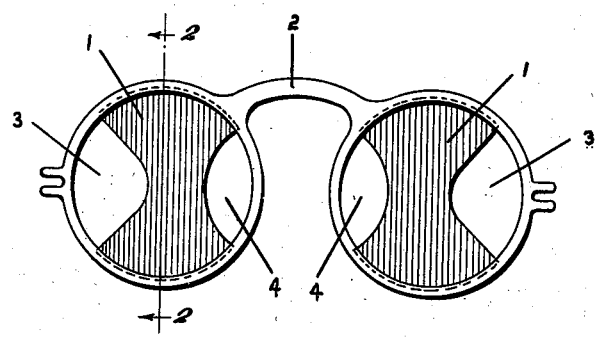

Sept. 19, 1944.  R. B. SNYDER  2,358,602
NIGHT DRIVING GOGGLE
Filed March 5, 1941

Ruth B Snyder INVENTOR.

Patented Sept. 19, 1944

2,358,602

UNITED STATES PATENT OFFICE 2,358,602

NIGHT DRIVING GOGGLE

Ruth B. Snyder, Bethlehem, Pa.

Application March 5, 1941, Serial No. 381,807

2 Claims. (Cl. 2—12)

This invention relates to a night driving goggle, primarily designed for use by operators of motor and other vehicles for night driving to avoid the glare of strong headlights of oncoming traffic, which is frequently blinding, but which can also be extended to cover other uses such as ordinary sun goggles, etc. The present invention provides specially designed non-glare lenses for night driving, made of glass or a similar substitute, such as some of the plastics, like "Plastacele." The lenses are designed with irregularly-shaped concave openings at temple sides for clear or unobstructed vision to each side of the road and are adapted to be mounted in spectacle frames for those who do not wear glasses and may be mounted in frames which fit over glasses for those who do wear them. One of the main objects of the invention is to make provision whereby drivers of any vehicle (motor or otherwise), or any other user, may have clear or unobstructed vision combined with protection from glare of any kind, either at night or day, by introducing a specially designed lens, such as this, embodying these two features. For night driving—this invention comprises a specially designed lens which must be made of a thin, light colored glass or substitute—preferably of a canary yellow or a very light amber, as this lens will absorb glare without obstructing vision and prevent temporary blindness by approaching lights. For such use, its advantages are twofold (a) in that the irregularly-shaped concave openings 3 and 3 at each temple side of the lenses give perfectly clear or unobstructed vision to each side of the road, and (b) simultaneously removes glare and temporary blindness by having the lenses so designed and arranged as to be in a direct line with the pupil of the eye. The invention may also be applied to regular sun goggles for protecting the eyes from glare. In applying this invention to sun or sport goggles, the same advantage of clear vision at each temple side of the lenses is also present. Also, the irregularly-shaped concave openings 3 and 3 at each temple side of the spectacle or goggle avoids the necessity of removing the goggle for seeing any desired object or discerning objects in their normal or natural condition. When these lenses are employed in sun or sport goggles, more satisfactory results are derived if the darker shades of glass, or substitute, such as some of the plastics, are used. As sun or sport goggles, the advantages are many-fold over the common ordinary type, as these are cooler since they permit ventilation through openings 3 and 3 and 4 and 4 (it being a known fact that all "specs" are hot in summer); handier, since the irregularly-shaped concave openings 3 and 3 eliminate removing or raising them in an emergency when both hands are occupied or employed as in fishing, golfing, driving a car, etc. and are more convenient for all purposes—especially sports.

After having given a brief outline of this invention, I will now refer to the accompanying drawing.

Fig. 1 is a front elevational view of a pair of night driving goggles, provided with my arrangement of specially designed lenses. By referring to this drawing, the application of the lenses 1 and 1 to the spectacle frame 2 will be clearly observed.

Figure 2:
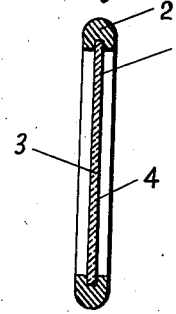

Fig. 2 is a cross-sectional view on the line 2—2 of Figure 1.

Figure 3:
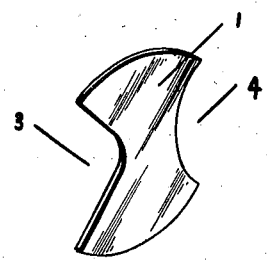

Fig. 3 represents a perspective view of the lenses 1 and 1 detached from the spectacle frame 2.

In my drawing, I have shown the sides of the lenses on the temple sides as being concavely shaped (somewhat exaggerated or irregular) in order to permit openings 3 and 3 to obtain clear or unobstructed vision and through which objects can be observed in their natural condition without lifting or raising to derive this objective. The sides of the lenses toward the nose are also concave in shape (but more regular) in order to produce openings 4 and 4, which too permit of clear vision but the main object of these being more ventilation—thereby making a goggle of this type cooler. If desired, the lenses may be convex on the sides toward the nose so as to close these openings 4 and 4, since there is ample clear vision and ventilation through the irregularly-shaped concave temple side openings 3 and 3.

I claim for this night driving goggle with specially designed lenses the following:

1. In driving goggles, a pair of translucent lenses, each of said lenses being provided with a recess in each side centered on the horizontal center line thereof with the innermost edge of each recess being spaced outwardly of the vertical center line, so as to form a lens body having a medial horizontally reduced portion increasingly tapering to the top and bottom edges, and a frame supporting said lenses so that with the wearer holding his head in normal driving position the medial portions will cover a substantial area directly in front of the eyes to provide a central glare shield while the recesses at each side thereof enable unobstructed vision of the sides of a roadway.

2. In driving goggles, a pair of translucent lenses each of said lenses having the inner side edge shaped to provide an arcuate recess and its outer edge shaped to provide an approximately V-shaped recess, said lens having the portions medially of its top and bottom edges and between the innermost edges of the recesses extended horizontally at each side of the vertical center line, with the lens increasingly tapering from said medial portion to the top and bottom edges, and a frame supporting said lenses so that with the wearer holding his head in a normal driving position the medial portions will be disposed to provide a glare shield of substantial area centrally in front of the eyes with the side recesses affording unobstructed vision of the sides of a roadway.

RUTH B. SNYDER.